US010789098B1

(12) United States Patent
Lin

(10) Patent No.: US 10,789,098 B1
(45) Date of Patent: Sep. 29, 2020

(54) RESOURCE TRANSFER OPERATIONS

(71) Applicant: Alibaba Group Holding Limited, George Town (KY)

(72) Inventor: Bingwen Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/813,210

(22) Filed: Mar. 9, 2020

Related U.S. Application Data

(63) Continuation of application No. PCT/CN2020/071146, filed on Jan. 9, 2020.

(30) Foreign Application Priority Data

Jun. 4, 2019 (CN) .......................... 2019 1 0482013

(51) Int. Cl.
*G06F 9/50* (2006.01)
*H04L 12/927* (2013.01)
(Continued)

(52) U.S. Cl.
CPC .............. *G06F 9/50* (2013.01); *G06F 9/5011* (2013.01); *H04L 41/22* (2013.01);
(Continued)

(58) Field of Classification Search
CPC ...... G06F 9/50; G06F 9/5011; H04M 15/765; H04M 15/7652; H04M 15/886; H04L 41/22; H04L 41/5032; H04L 65/1033
See application file for complete search history.

(56) References Cited

U.S. PATENT DOCUMENTS 9,262,217 B1 * 2/2016 Xiang .................... G06F 9/5011
2014/0344089 A1 11/2014 Hanna et al.
(Continued)

FOREIGN PATENT DOCUMENTS

CN 104915742 9/2015
CN 105139193 12/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Kyung H Shin
(74) *Attorney, Agent, or Firm* — Fish & Richardson P.C.

(57) ABSTRACT

Implementations of this disclosure provide for resource transfer operations. An example method performed by a computing device includes receiving a resource transfer request that includes a user identifier of a user; obtaining profile data for a plurality of dimensions of the user; determining for each dimension, a field value of a feature field corresponding to the dimension; generating for each dimension, one or more user label values for the user, based on the field value of the feature field corresponding to the dimension; determining, for each of the one or more user label values for the user, an initial resource quota corresponding to the user label value for the user; determining a final resource quota for the user based on initial resource quotas; and transferring, by the computing device, resources to the user based on the final resource quota.

18 Claims, 7 Drawing Sheets

(51) Int. Cl.
*H04L 12/911* (2013.01)
*H04L 12/26* (2006.01)
*H04L 12/723* (2013.01)
*H04L 12/923* (2013.01)
*H04L 12/24* (2006.01)
*H04M 15/00* (2006.01)
*H04L 29/06* (2006.01)

(52) U.S. Cl.
CPC .......... *H04L 43/0805* (2013.01); *H04L 45/50* (2013.01); *H04L 47/762* (2013.01); *H04L 47/781* (2013.01); *H04L 47/808* (2013.01); *H04M 15/765* (2013.01); *H04L 41/5032* (2013.01); *H04L 65/1033* (2013.01); *H04M 15/7652* (2013.01); *H04M 15/886* (2013.01)

(56) References Cited

U.S. PATENT DOCUMENTS

| | | | | |
|---|---|---|---|---|
| 2015/0188840 | A1* | 7/2015 | Xiao | G06F 9/50 709/226 |
| 2015/0288827 | A1* | 10/2015 | Bejerano | H04M 15/765 455/406 |
| 2016/0350721 | A1 | 12/2016 | Cornerford et al. | |
| 2017/0272379 | A1* | 9/2017 | McClean | H04L 41/22 |

FOREIGN PATENT DOCUMENTS

| | | |
|---|---|---|
| CN | 106097023 | 11/2016 |
| CN | 108305102 | 7/2018 |
| CN | 109087148 | 12/2018 |
| CN | 109636501 | 4/2019 |
| CN | 109685538 | 4/2019 |
| CN | 110264255 | 9/2019 |

OTHER PUBLICATIONS

Nakamoto, "Bitcoin: A Peer-to-Peer Electronic Cash System," www.bitcoin.org, 2005, 9 pages.

Jinbo, "Application of User Portrait in Internet Finance", Modern Business, Nov. 28, 2017, 4 pages (with machine translation).

PCT International Search Report and Written Opinion in International Application No. PCT/CN2020/071146, dated Apr. 15, 2020, 21 pages (with machine translation).

* cited by examiner

RESOURCE TRANSFER OPERATIONS

CROSS-REFERENCE TO RELATED APPLICATIONS

This application is a continuation of PCT Application No. PCT/CN2020/071146, filed on Jan. 9, 2020, which claims priority to Chinese Patent Application No. 201910482013.X, filed on Jun. 4, 2019, and each application is hereby incorporated by reference in its entirety.

TECHNICAL FIELD

One or more implementations of the present specification relate to the field of computer technologies, and in particular, to resource transfer methods and devices, and red envelope issuing methods, apparatuses and devices.

BACKGROUND

With the rapid development of Internet technologies, various network platforms are constantly emerging. As a result, competition between various network platforms is also increasing. In order to improve their competitiveness, the network platforms constantly attract new users or increase their conversion rates. In order to attract new users or increase their conversion rates, the network platforms usually transfer resources to the access users. For example, the network platforms can issue red envelopes to the access users.

In the conventional technology, when transferring resources to the access users, a network platform usually transfers resources of a fixed quota for all access users, and the fixed quota is set by a service provider based on experience of the service provider. Therefore, there is a need to provide a more flexible resource transfer method to enhance user experience.

SUMMARY

One or more implementations of the present specification describe resource transfer methods and devices, and red envelope issuing methods, apparatuses and devices, to transfer resources more flexibly to users, so as to greatly improve user experience.

According to a first aspect, a resource transfer method is provided, including: receiving a resource transfer request from a user, where the resource transfer request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and resource quotas, a plurality of initial resource quotas corresponding to each user label value of the user; determining a final resource quota of the user based on the plurality of initial resource quotas; and transferring resources to the user based on the final resource quota.

According to a second aspect, a red envelope issuing method is provided, including: receiving a page access request from a user, where the page access request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and red envelope amounts, a plurality of initial red envelope amounts corresponding to each user label value of the user; determining a final red envelope amount of the user based on the plurality of initial red envelope amounts; and issuing a red envelope to the user based on the final red envelope amount.

According to a third aspect, a resource transfer device is provided, including: a receiving unit, configured to receive a resource transfer request from a user, where the resource transfer request includes at least a user identifier of the user; an acquisition unit, configured to obtain profile data of a plurality of dimensions of the user based on the user identifier; a determining unit, configured to determine a field value of a feature field corresponding to each dimension based on the profile data of each dimension; where the determining unit is further configured to determine a plurality of user label values of the user based on the field value of the feature field corresponding to each dimension; the determining unit is further configured to determine, based on a correspondence between user label values and resource quotas, a plurality of initial resource quotas corresponding to each user label value of the user; and the determining unit is further configured to determine a final resource quota of the user based on the plurality of initial resource quotas; and a transfer unit, configured to transfer resources to the user based on the final resource quota.

According to a fourth aspect, a red envelope issuing device is provided, including: a receiving unit, configured to receive a page access request from a user, where the page access request includes at least a user identifier of the user; an acquisition unit, configured to obtain profile data of a plurality of dimensions of the user based on the user identifier; a determining unit, configured to determine a field value of a feature field corresponding to each dimension based on the profile data of each dimension; where the determining unit is further configured to determine a plurality of user label values of the user based on the field value of the feature field corresponding to each dimension; the determining unit is further configured to determine, based on a correspondence between user label values and red envelope amounts, a plurality of initial red envelope amounts corresponding to each user label value of the user; and the determining unit is further configured to determine a final red envelope amount of the user based on the plurality of initial red envelope amounts; and a sending unit, configured to issue a red envelope to the user based on the final red envelope amount.

According to a fifth aspect, a resource transfer device is provided, including: a memory; at least one processor; and at least one program, where the at least one program is stored in the memory and configured to be executed by the at least one processor to implement the following steps: receiving a resource transfer request from a user, where the resource transfer request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and resource quotas, a plurality of initial resource quotas corresponding to each user label value of the user; determining a final resource quota of the user based on the plurality of initial resource quotas; and transferring resources to the user based on the final resource quota.

According to a sixth aspect, a red envelope issuing device is provided, including: a memory; at least one processor; and at least one program, where the at least one program is stored in the memory and configured to be executed by the at least one processor to implement the following steps: receiving a page access request from a user, where the page access request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and red envelope amounts, a plurality of initial red envelope amounts corresponding to each user label value of the user; determining a final red envelope amount of the user based on the plurality of initial red envelope amounts; and issuing a red envelope to the user based on the final red envelope amount.

One or more implementations provide resource transfer methods and devices, and red envelope issuing methods, apparatuses and devices. A resource transfer method includes: receiving a resource transfer request from a user, where the resource transfer request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and resource quotas, a plurality of initial resource quotas corresponding to each user label value of the user; determining a final resource quota of the user based on the plurality of initial resource quotas; and transferring resources to the user based on the final resource quota. That is, in the solutions provided in the present specification, a plurality of label values of the user are determined based on the profile data of different dimensions of the user, and then the final resource quota of the user is determined based on the initial resource quotas corresponding to the plurality of label values. As a result, resources of different quotas can be transferred to different users, thereby greatly improving flexibility of resource transfer.

BRIEF DESCRIPTION OF DRAWINGS

To describe the technical solutions in the implementations of the present specification more clearly, the following briefly introduces the accompanying drawings required for describing the implementations. Clearly, the accompanying drawings in the following description are merely some implementations of the present specification, and a person of ordinary skill in the field can still derive other drawings from these accompanying drawings without creative efforts.

DESCRIPTION OF IMPLEMENTATIONS

Figure 1:
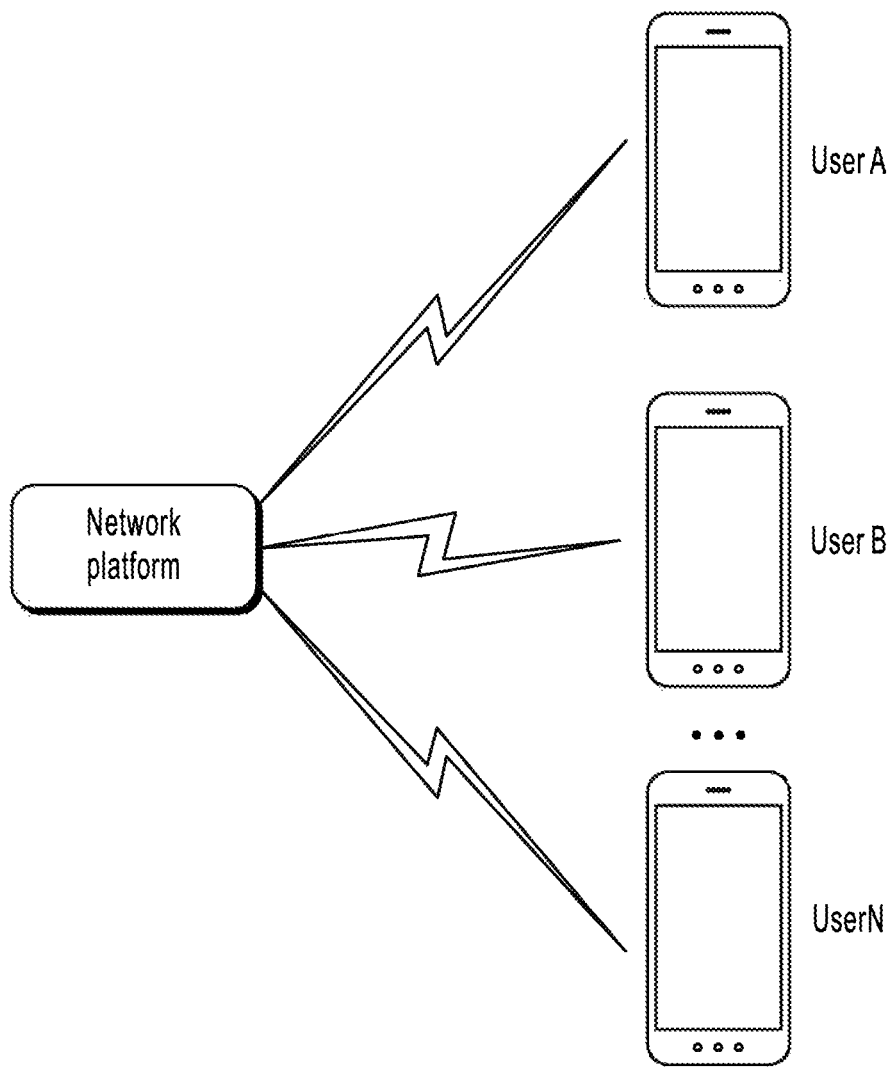
FIG. 1 is a schematic diagram illustrating an application scenario of a resource transfer method, according to the present specification.

The solutions provided in the present specification are described below with reference to the accompanying drawings.

Before describing the solutions provided in the present specification, the following first describes the invention conception of the solutions.

As described in the background, in the conventional resource transfer method, resources of fixed quota are usually transferred to all access users. For example, a red envelope of the same amount is issued to all the users. This resource transfer method is usually not flexible enough to really improve the conversion rate. In order to transfer resources more flexibly, the applicant of the present invention considers transferring resources of different quotas to different users. To this end, the problem of how to describe users accurately needs to be resolved first.

A resource transfer request is a virtual instance of a ticket for claiming goods or services. Resource transfer requests may include, for example, an electronic voucher having certain monetary value and can be exchanged for goods and services, an electronic coupon that can be used by consumers at the time of consumption to purchase a product at a discounted price according to a discount rate indicated by the coupon, or an electronic gift certificate that can be used for goods or services at specified merchants. As disclosed herein, "red envelopes" are a particular non-limiting example of a type of resource transfer request.

In the solutions provided in the present specification, users can be described based on profile data of several dimensions, such as historical access behavior data and/or transaction behavior data, user description data, and transaction data, etc. The behavior data can be obtained by parsing service logs of a network platform. The user description data can be recorded after being filled by a user on the network platform, or can be extracted from other network platforms. The user description data includes, but is not limited to, gender, age, occupation, birthplace, and identity card number, etc. The transaction data can be obtained by analyzing transaction behavior of the user, such as membership level and transaction frequency.

It should be noted that, in order to improve the efficiency of determining subsequent resource quotas (also referred to as the pricing process), in the solutions, the profile data of a plurality of dimensions can be refined into corresponding indicators. The refinement process may be as follows:

Firstly, for each dimension, a corresponding feature field can be set. In an implementation, the feature field corresponding to each dimension can be determined by an AB test. Taking a dimension as an example, two different feature fields (which means that the two fields themselves are different or the quantities of fields are different) can be predetermined. Then, the field values of the two different feature fields are determined based on the profile data of the corresponding dimension of a plurality of sample users, and then used as input into two different models (which is described later). The corresponding feature fields of the dimension are determined based on the errors between the prediction results of the two models and the actual results.

It can be understood that when there is profile data of a plurality of dimensions, the process of determining the feature fields corresponding to the plurality of dimensions can be performed simultaneously. In addition, the process of determining the feature fields is executed repeatedly.

Secondly, for the extracted feature fields, the value ranges of the field values of different feature fields are usually different. Therefore, the value range of the field value of each feature field can be divided into a plurality of value intervals, and a corresponding user label value can be set for each value interval. These user label values are the metric values that need to be refined in the solutions. Then, the field value of the feature field corresponding to each dimension is determined based on the profile data of each dimension of the current user. Then, the profile data of each dimension is refined after the plurality of user label values of the user are determined based on the field value of the feature field corresponding to each dimension.

After the previous refinement process is completed, that is, after the plurality of user label values are determined, the resource quota of the user can be determined based on the initial resource quotas corresponding to the plurality of user label values and the historical resource transfer records of the user.

The foregoing is the invention conception of the solutions. The technical solutions provided in the present specification can be obtained based on the invention conception. The technical solutions are described in detail below.

FIG. 1 is a schematic diagram illustrating an application scenario of a resource transfer method, according to the present specification. In FIG. 1, a network platform can receive a page access request from a user. The page access request may be initiated by the user by scanning the two-dimensional code of the network platform, or may be initiated by the user by copying the link address of the network platform to a specified location (for example, the search box of the network platform). It is worthwhile to note that the page access request can include a user identifier, such as UID. The network platform obtains profile data of a plurality of dimensions of the user based on the user identifier. A field value of a feature field corresponding to each dimension is determined based on the profile data of each dimension. A plurality of user label values of the user are determined based on the field value of the feature field corresponding to each dimension. A plurality of initial resource quotas corresponding to each user label value of the user are determined based on a correspondence between user label values and resource quotas. A final resource quota of the user is determined based on the plurality of initial resource quotas. Resources are transferred to the user based on the final resource quota.

The resources here may be, for example, electronic assets, and a method for transferring the resources to the user based on the final resource quota may be sending a red envelope. For example, after a final red envelope amount of a user is determined, a red envelope receiving page can be loaded. The red envelope receiving page can display a to-be-received red envelope for the user. Then, when a click instruction specific to the to-be-received red envelope is received, a red envelope is issued to the user based on the final red envelope amount, and the final red envelope amount is displayed for the user.

Figure 2:
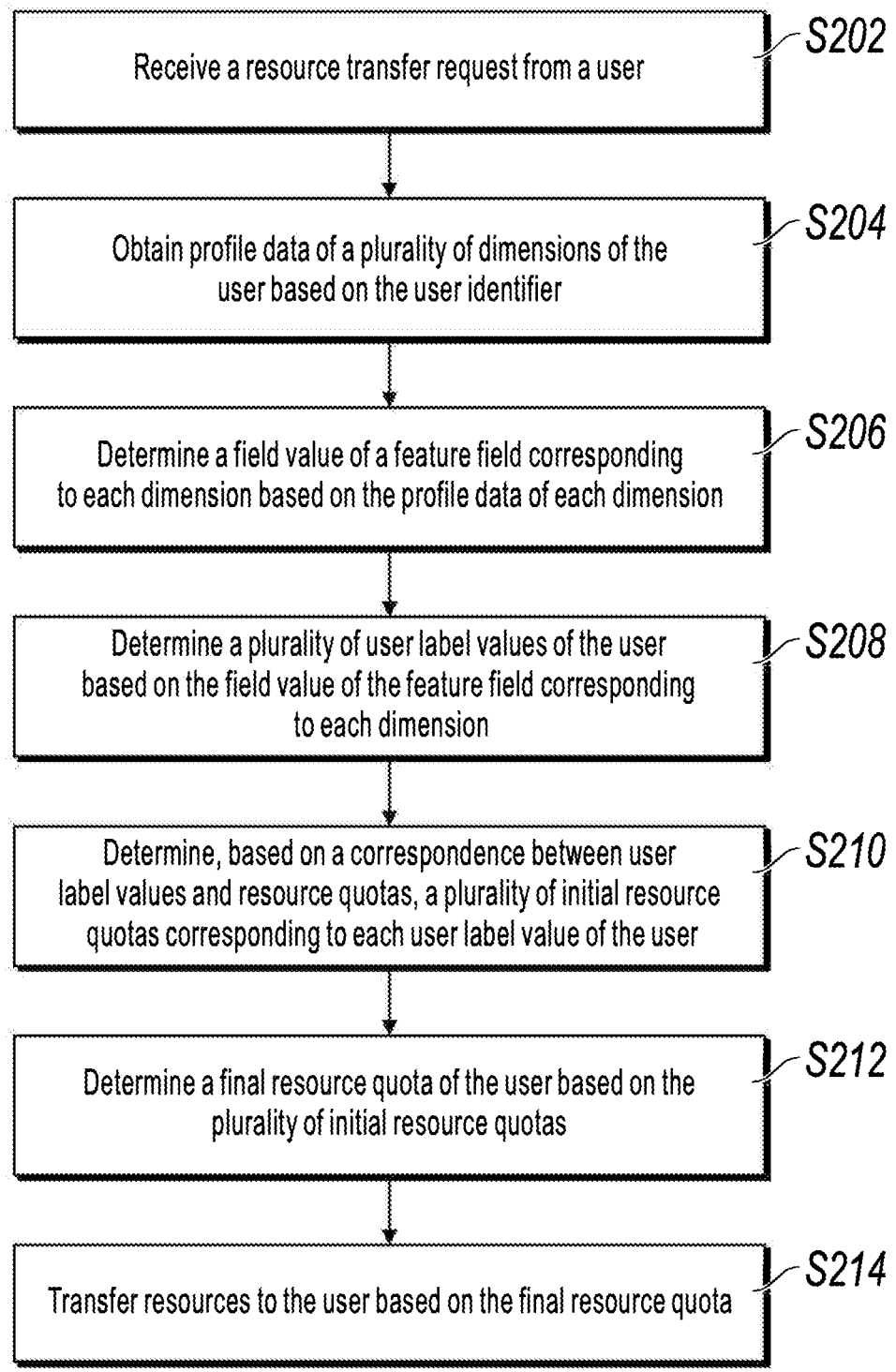
FIG. 2 is a flowchart illustrating a resource transfer method, according to an implementation of the present specification.

FIG. 2 is a flowchart illustrating a resource transfer method, according to an implementation of the present specification. The method may be executed by a server, a system, or a device that has a processing capability, for example, the network platform in FIG. 1. As shown in FIG. 2, the method can specifically include the following steps:

Step S202: Receive a resource transfer request from a user.

The resource transfer request can include at least a user identifier of the user.

For example, if the resource is an electronic asset, the resource transfer request may be a page access request. The page access request may be initiated by the user by scanning the two-dimensional code of the network platform, or may be initiated by the user by copying the link address of the network platform to a specified location (for example, the search box of the network platform).

Step S204: Obtain profile data of a plurality of dimensions of the user based on the user identifier.

As mentioned earlier, profile data of a plurality of dimensions here may include several of historical access behavior data and/or transaction behavior data, user description data, and transaction data. The behavior data can be obtained by parsing service logs of a network platform. The user description data can be recorded after being filled by a user on the network platform, or can be extracted from other network platforms. The user description data includes, but is not limited to, gender, age, occupation, birthplace, and identity card number. The transaction data can be obtained by analyzing transaction behavior of the user, such as membership level and transaction frequency.

It is worthwhile to note that the profile data of the plurality of dimensions can be obtained offline or in real time, which is not limited in the present specification.

Step S206: Determine a field value of a feature field corresponding to each dimension based on the profile data of each dimension.

As mentioned earlier, the feature field corresponding to each dimension here can be determined by the AB test.

For example, it is assumed that the feature fields corresponding to the user description data are Gender and Age, and the obtained user description data is "a young woman aged 25 years". Then, the following feature fields can be determined: field value of Gender: female; field value of Age: 25 years.

Step S208: Determine a plurality of user label values of the user based on the field value of the feature field corresponding to each dimension.

There may be one or more feature fields corresponding to each dimension here.

Taking any one of the feature fields corresponding to each dimension as an example, the previous determining process may be: determining a target value interval in which a field value of the first field falls from a plurality of value intervals corresponding to the first field. The plurality of value ranges here are obtained by dividing the value ranges of the field values of the first field. The first label value corresponding to the target value interval is determined based on the correspondence between value intervals and user label values. For example, the correspondence here may be: a value interval [0,100] corresponds to label value "1", and a value interval (100,200] corresponds to label value "2", etc.

It is worthwhile to note that, in this implementation, because the corresponding user label value is determined based on the value interval, a non-numeric field value can be converted to a numerical field value first, and then a corresponding user label value can be determined based on the value interval of the numerical field value. Taking the feature field Gender as an example, the field value can be converted to a numerical field value as 0 (or 1), and the field value Female is converted to a numerical field value as 1 (or 0). Then, the corresponding value interval is determined based on the numerical field value.

It can be understood that for the field value of each feature field, a plurality of user label values can be obtained after the user label value corresponding to the target value interval is determined.

In the present specification, different value intervals are set for different feature fields, so that the field values of the feature fields can be divided more accurately and the user label values can be determined more effectively.

Step S210: Determine, based on a correspondence between user label values and resource quotas, a plurality of initial resource quotas corresponding to each user label value of the user.

For example, if the resource is an electronic asset, the resource quota here can be a red envelope amount. In addition, the determined plurality of initial resource quotas of the user are the plurality of initial red envelope amounts.

Step S212: Determine a final resource quota of the user based on the plurality of initial resource quotas.

In an implementation, weighted summation can be performed on the plurality of initial resource quotas to obtain the final resource quota of the user. The weight value corresponding to each initial resource quota can be initially set based on experience and then optimized continuously in the process of transferring resources to different users.

In another implementation, the historical resource transfer records of the user can be obtained first based on the user identifier. The historical resource transfer records include at least the quantity of historical requests (also referred to as the quantities of historical pricing) and the quantity of historical transfers (also referred to as the quantities of historical write-off) of resources. Then, the final resource quota of the user is determined based on the quantity of historical pricing, the quantity of historical write-off, and the plurality of initial resource quotas.

The step of determining the final resource quota of the user in the previous another implementation can be implemented by using the following formula:

$$Z = \sum_{i=1}^{i=N} x_i * y_i - (p_1 - 1) * a_0 * e^{-\pi p_1^2} + \quad \text{(Formula 1)}$$

$$a_1 * rand(0, 1) + a_3 * \left(1 - \frac{p_2}{p_1}\right)$$

$$\begin{cases} x_1 + x_2 + \ldots + x_N \leq S \\ S_{min} \leq Z \leq S_{max} \\ y_1 + y_2 + \ldots + y_N = 1 \end{cases}$$

In this formula, Z is the final resource quota; N is the quantity of feature fields; $x_i$ is the initial resource quota corresponding to the user label value i; $y_i$ is the weight value of the user label value i; $p_1$ is the quantity of historical pricing; $p_2$ is the quantity of historical write-off; $a_0$ is a random attenuation factor; $a_1$ is a random factor; $a_3$ is a weighting factor; S is the predetermined quota; S min is the lower limit of the predetermined range; and S max is the upper limit of the predetermined range.

When the resource quota of the user is determined by using formula 1, the determined final resource quota varies with the user label value. In addition, each time the user label value changes, the resource quota will be changed. As such, the resource quota of the user can be dynamically determined. In addition, a0, a1, a3, S min, and S max in formula 1 may be initially set based on experience and then optimized based on the error between the determined result and the actual result after the corresponding final resource quotas of a plurality of users are determined.

In an example, the optimization process can be alternatively performed in combination with a constraint $x_1 + x_2 + \ldots + x_N \leq S$. The value of S here is also within the predetermined range.

In addition, formula 1 may also be referred to as a resource quota determining model. It is worthwhile to note that the two different models described in the invention conception may be obtained through transformations based on the resource quota determining model. For example, for model 1, the value of N in formula 1 can be set to 5; for model 2, the value of N in formula 1 can be set to 10, etc.

It is worthwhile to note that, after the final resource quota of the user is determined by any one of the previous implementations, it may also be determined whether the determined final resource quota is within a predetermined range. If no, when the final resource quota is greater than the upper limit of the predetermined range (for example, S max in the previous formula), the upper limit is determined as the final resource quota. When the final resource quota is less than the lower limit of the predetermined range (for example, S min in the previous formula), the lower limit is determined as the final resource quota.

Finally, in other implementations, the final resource quota of the user can be determined based on a predefined rule. The predefined rule here can be some predetermined methods for determining resource quotas. For example, for a specified user group (corresponding to a fixed user label value), the corresponding final resource quota is determined by using a predetermined method. In this implementation, the conversion cost can be controlled when the final resource quota of the user is determined.

Step S214: Transfer resources to the user based on the final resource quota.

For example, if the resource is an electronic asset, after the final red envelope amount of the user is determined, a red envelope receiving page can be loaded. The red envelope receiving page can display a to-be-received red envelope for the user. Then, when a click instruction specific to the to-be-received red envelope is received, a red envelope is issued to the user based on the final red envelope amount, and the final red envelope amount is displayed for the user.

After the previous resource transfer process is completed, the historical resource transfer records of the user can be updated. For example, the quantity of historical pricing of the user is increased by 1. In addition, after the resource transfer succeeds, the quantity of historical write-off can be increased by 1, etc. Through this update process, feature data can be back-propagated, and the accuracy of determining resource quotas can be improved.

In summary, according to the resource transfer method provided in this implementation of the present specification, the profile data of the user can be refined into a plurality of different user label values, and then the plurality of different initial resource quotas can be determined based on different user label values. Finally, the final resource quota of the user is determined based on the plurality of different initial resource quotas. Therefore, resources can be transferred to different users based on different quotas. In addition, when the resource quota of the user is determined based on the historical resource transfer records of the user, the resource quota transferred for the same user may change each time, thereby greatly improving the flexibility of resource transfer. Finally, in this solution, the AB test is used to determine the feature field corresponding to each dimension, thereby improving the accuracy and validity of feature field selection.

Figure 3:
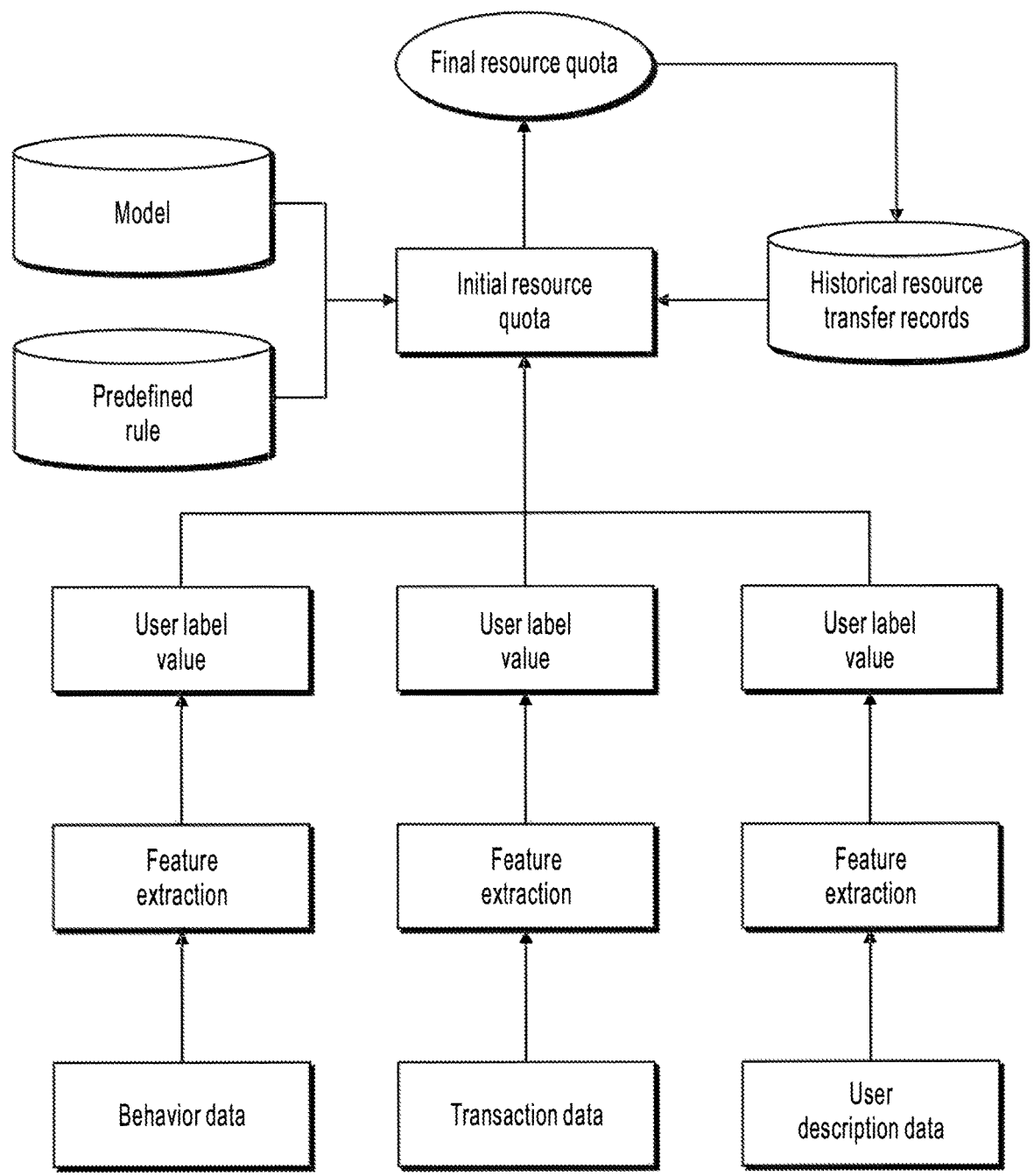
FIG. 3 is a schematic diagram illustrating a resource transfer method, according to the present specification.

FIG. 3 is a schematic diagram illustrating a resource transfer method, according to the present specification. In FIG. 3, when a resource transfer request is received from a user, profile data of the following dimensions of the user is obtained: historical access behavior data and/or transaction behavior data, user description data, and transaction data. A field value of a feature field corresponding to each dimension is determined based on the profile data of each dimension. A plurality of user label values of the user are determined based on the field value of the feature field corresponding to each dimension. A plurality of initial resource quotas corresponding to each user label value of the user are determined based on a correspondence between user label values and resource quotas. A final resource quota is determined based on a resource quota determining model, a predefined rule, historical resource transfer records, and a plurality of initial resource quotas. Finally, the historical resource transfer records of the user can be updated, so that feature data of the user can be back-propagated.

The following describes the resource transfer method provided in the present specification based on an example in which the resource is an electronic asset and a red envelope is issued in an implementation of transferring resources to a user based on the final resource quota.

Figure 4:
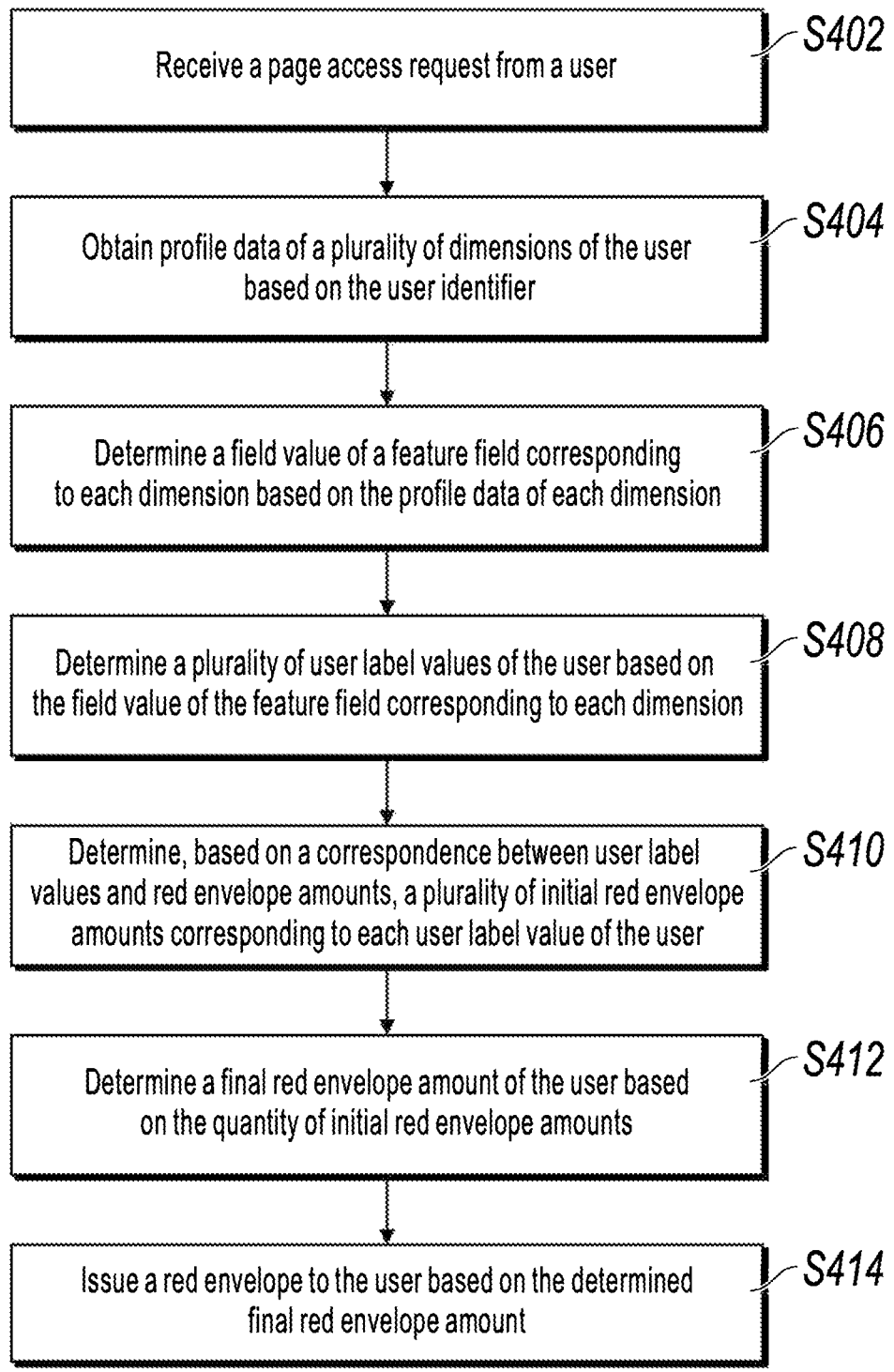
FIG. 4 is a flowchart illustrating a red envelope issuing method, according to the present specification.

FIG. 4 is a flowchart illustrating a red envelope issuing method, according to the present specification. The method may be executed by a server, system, or device that has a processing capability, for example, the network platform in FIG. 1. As shown in FIG. 4, the method can specifically include the following steps:

Step S402: Receive a page access request from a user.

The page access request may be initiated by the user by scanning the two-dimensional code of the network platform, or may be initiated by the user by copying the link address of the network platform to a specified location (for example, the search box of the network platform). The page access request here can include at least a user identifier of the user.

Step S404: Obtain profile data of a plurality of dimensions of the user based on the user identifier.

As mentioned earlier, profile data for a plurality of dimensions here may include several of historical access behavior data and/or transaction behavior data, user description data, and transaction data. The behavior data can be obtained by parsing service logs of a network platform. The user description data can be recorded after being filled by a user on the network platform, or can be extracted from other network platforms. The user description data includes, but is not limited to, gender, age, occupation, birthplace, and identity card number. The transaction data can be obtained by analyzing transaction behavior of the user, such as membership level and transaction frequency.

Step S406: Determine a field value of a feature field corresponding to each dimension based on the profile data of each dimension.

As mentioned earlier, the feature field corresponding to each dimension here can be determined by the AB test.

For example, it is assumed that the feature fields corresponding to the user description data are Gender and Age, and the obtained user description data is "a young woman aged 25 years". Then, the following feature fields can be determined: field value of Gender: female; field value of Age: 25 years.

Step S408: Determine a plurality of user label values of the user based on the field value of the feature field corresponding to each dimension.

There may be one or more feature fields corresponding to each dimension here.

Taking any one of the feature fields corresponding to each dimension as an example, the previous determining process may be: determining a target value interval in which a field value of the first field falls from a plurality of value intervals corresponding to the first field. The plurality of value ranges here are obtained by dividing the value ranges of the field values of the first field. The first label value corresponding to the target value interval is determined based on the correspondence between value intervals and user label values. For example, the correspondence here may be: value interval [0,100] corresponds to label value "1", value interval (100,200] corresponds to label value "2", etc.

It is worthwhile to note that, in this implementation, because the corresponding user label value is determined based on the value interval, a non-numeric field value can be converted to a numerical field value first, and then a corresponding user label value can be determined based on the value interval of the numerical field value. Taking the feature field Gender as an example, the field value can be converted to a numerical value as 0 (or 1), and the field value Female is converted to a numerical field value as 1 (or 0). Then, the corresponding value interval is determined based on the numerical field value.

It can be understood that for the field value of each feature field, a plurality of user label values can be obtained after the user label value corresponding to the target value interval is determined.

In the present specification, different value intervals are set for different feature fields, so that the field values of the feature fields can be divided more accurately and the user label values can be determined more effectively.

Step S410: Determine, based on a correspondence between user label values and red envelope amounts, a plurality of initial red envelope amounts corresponding to each user label value of the user.

Step S412: Determine a final red envelope amount of the user based on the quantity of initial red envelope amounts.

In an implementation, weighted summation can be performed on the plurality of initial red envelope amounts to obtain the final red envelope amount of the user. The weight value corresponding to each initial red envelope amount can be initially set based on experience and then optimized continuously in the process of issuing red envelopes to different users.

In another implementation, the history red envelope issuance records of the user can be obtained first based on the user identifier. The history red envelope issuance records include at least a quantity of historical pricing and a quantity of historical write-off. Then, the final red envelope amount of the user is determined based on the quantity of historical pricing, the quantity of historical write-off, and the plurality of initial red envelope amounts. It is worthwhile to note that when the final red envelope amount of the user is determined based on this implementation, the sum of the plurality of initial red envelope amounts may not exceed a predetermined amount, and both the predetermined amount and the final red envelope amount are within the predetermined range.

In another implementation, the step of determining the final red envelope amount of the user (also referred to as the pricing step) may be implemented by using formula 1. When the pricing step is implemented by using formula 1, Z is the final red envelope amount; N is the quantity of feature fields; xi is the initial red envelope amount corresponding to the user label value i; yi is the weight value of the user label value i; p1 is the quantity of historical pricing; p2 is the quantity of historical write-off a0 is a random attenuation factor; a1 is a random factor, a3 is a weighting factor; S is the predetermined amount; S min is the lower limit of the predetermined range; and S min is the upper limit of the predetermined range.

a0, a1, a3, S min, and S max in formula 1 may be initially set based on experience and then optimized based on the error between the determined result and the actual result after determining the corresponding final red envelope amount for a plurality of users.

In an example, the optimization process can be alternatively performed in combination with a constraint $x_1 + x_2 + \ldots + x_N \leq S$. The value of S here is also within the predetermined range.

It is worthwhile to note that, after the final red envelope amount of the user is determined based on any one of the previous implementations, it may also be determined whether the determined final red envelope amount is within the predetermined range. If no, the upper limit is determined as the final red envelope amount when the final red envelope amount is greater than the upper limit of the predetermined range (for example, S max in the previous formula). When the final red envelope amount is less than the lower limit of the predetermined range (for example, S min in the previous formula), the lower limit is determined as the final red envelope amount.

Finally, in other implementations, the final red envelope amount of the user can be determined based on a predefined rule. The predefined rule here can be a predetermined method for determining red envelope amounts. For example, for a specified user group (corresponding to a fixed user label value), the corresponding final red envelope amount is determined by using a predetermined method. In this implementation, the conversion cost can be controlled when the final red envelope amount of the user is determined.

Step S414: Issue a red envelope to the user based on the determined final red envelope amount.

After a final red envelope amount of a user is determined, a red envelope receiving page can be loaded. The red envelope receiving page can display a to-be-received red envelope for the user. Then, when a click instruction specific to the to-be-received red envelope is received, a red envelope is issued to the user based on the final red envelope amount, and the final red envelope amount is displayed for the user.

After the previous red envelope issuing process is completed, the historical red envelope issuance records of the user can be updated. For example, the quantity of historical pricing of the user is increased by 1. In addition, after the red envelope is issued successfully, the quantity of historical write-off can be increased by 1. Through this update process, feature data can be back-propagated, and the accuracy of determining red envelope amounts can be improved.

In summary, according to the method for issuing red envelopes provided in the present specification, different red envelope amounts can be issued to different users. In addition, the red envelope amount issued to the same user can change each time, thereby greatly improving the flexibility of issuing red envelopes.

Figure 5:
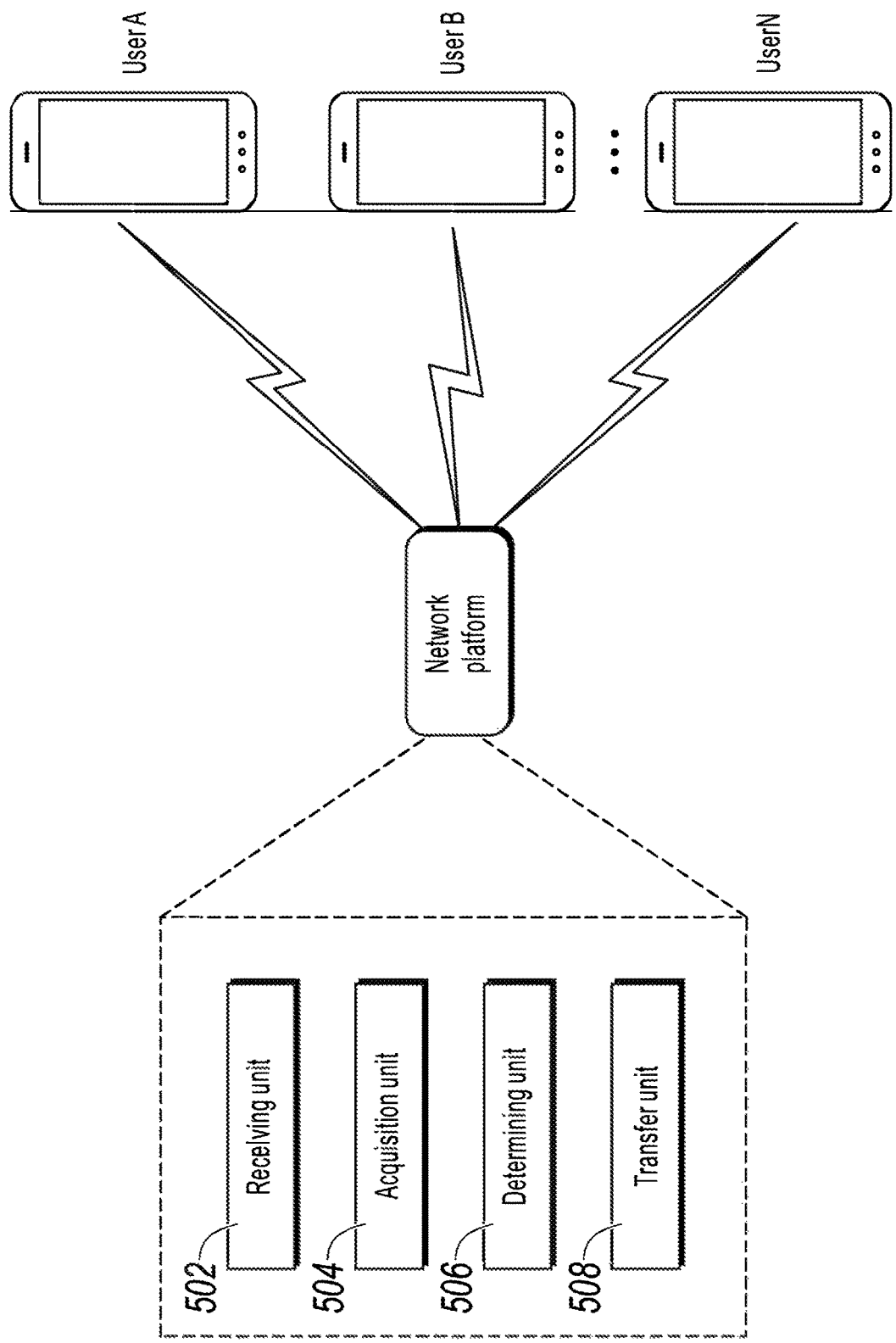
FIG. 5 is a schematic diagram illustrating a resource transfer device, according to an implementation of the present specification.

Corresponding to the previous resource transfer method, an implementation of the present specification further provides a resource transfer device. As shown in FIG. 5, the device can include: a receiving unit 502, configured to receive a resource transfer request from a user, where the resource transfer request includes at least a user identifier of the user; an acquisition unit 504, configured to obtain profile data of a plurality of dimensions of the user based on the user identifier, where the profile data of the plurality of dimensions includes several of historical access behavior data and/or transaction behavior data, user description data, and transaction data; a determining unit 506, configured to determine a field value of a feature field corresponding to each dimension based on the profile data of each dimension that is obtained by the acquisition unit 504, where the feature field corresponding to each dimension is determined based on a result of an AB test; the determining unit 506 is further configured to determine a plurality of user label values of the user based on the field value of the feature field corresponding to each dimension, where the feature field corresponding to each dimension includes a first field; and the plurality of user label values include a first label value; the determining unit 506 can be specifically configured to: determine, from a plurality of value intervals corresponding to the first field, a target value interval in which the field value of the first field falls, where the plurality of value intervals are obtained by dividing a value range of the field value of the first field; and determine the first label value corresponding to the target value interval based on the correspondence between value intervals and user label values; the determining unit 506 is further configured to determine, based on a correspondence between user label values and resource quotas, a plurality of initial resource quotas corresponding to each user label value of the user; the determining unit 506 is further configured to determine a final resource quota of the user based on the plurality of initial resource quotas; and the determining unit 506 can be specifically configured to: perform weighted summation on the plurality of initial resource quotas to obtain the final resource quota of the user; and a transfer unit 508, configured to transfer resources to the user based on the final resource quota that is determined by the determining unit 506.

The acquisition unit 504 is configured to obtain profile data of a plurality of dimensions of the user based on the user identifier, where the historical resource transfer records include at least a quantity of historical requests and a quantity of historical transfers of resources; and the determining unit 506 can be specifically configured to: determine the final resource quota of the user based on the quantity of historical requests, the quantity of historical transfers, and the plurality of initial resource quotas.

Optionally, the device can further include: a judging unit 510, configured to determine whether the final resource quota is a value within a predetermined range; where the determining unit 506 is further configured to: when the final resource quota is greater than an upper limit of a predetermined range, determine the upper limit as the final resource quota; or when the final resource quota is less than a lower limit of a predetermined range, determine the lower limit as the final resource quota.

The functions of the functional modules of the device in this implementation of the present specification can be implemented by the steps of the previous method implementations. Therefore, a specific working process of the device provided in this implementation of the present specification is omitted here.

According to the resource transfer device provided in this implementation of the present specification, the receiving unit 502 receives a resource transfer request from a user, where the resource transfer request includes at least a user identifier of the user. The acquisition unit 504 obtains profile data of a plurality of dimensions of the user based on the user identifier. The determining unit 506 determines a field value of a feature field corresponding to each dimension based on the profile data of each dimension. The determining unit 506 determines a plurality of user label values of the user based on the field value of the feature field corresponding to each dimension. The determining unit 506 determines, based on a correspondence between user label values and resource quotas, a plurality of initial resource quotas corresponding to each user label value of the user. The determining unit 506 determines a final resource quota of the user based on the plurality of initial resource quotas. The transfer unit 508 transfers resources to the user based on the final resource quota. As a result, resources can be transferred to different users based on different quotas, thereby greatly improving flexibility of resource transfer.

The resource transfer device provided in this implementation of the present specification can be a module or unit of the network platform in FIG. 1.

Figure 6:
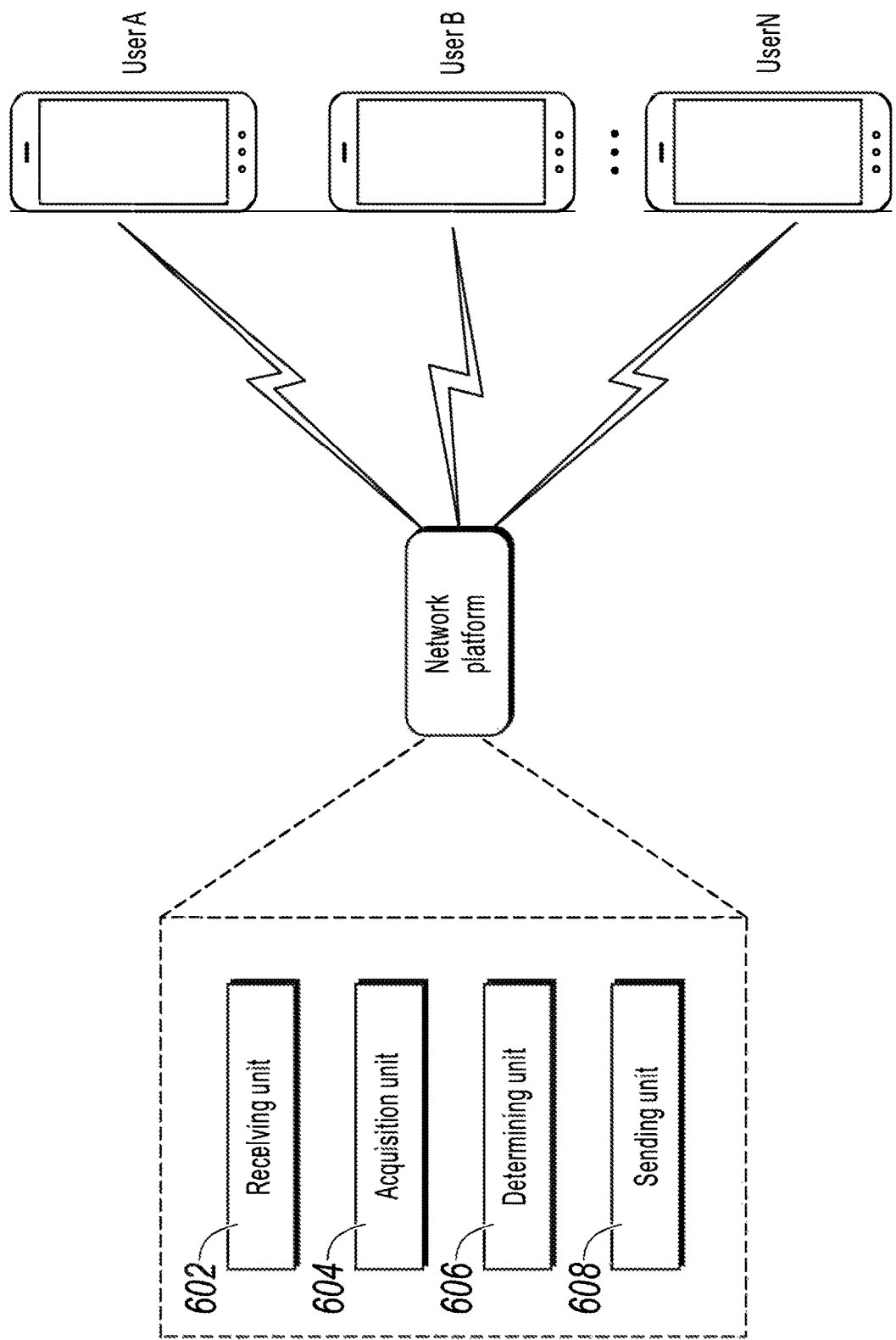
FIG. 6 is a flowchart illustrating a red envelope issuing method, according to the present specification.

Corresponding to the previous red envelope issuing method, an implementation of the present specification further provides a red envelope issuing device. As shown in FIG. 6, the device can include: a receiving unit 602, configured to receive a page access request from a user, where the page access request includes at least a user identifier of the user; an acquisition unit 604, configured to obtain profile data of a plurality of dimensions of the user based on the user identifier; a determining unit 606, configured to determine a field value of a feature field corresponding to each dimension based on the profile data of each dimension that is obtained by the acquisition unit 604; where the determining unit 606 is further configured to determine a plurality of user label values of the user based on the field value of the feature field corresponding to each dimension; the determining unit 606 is further configured to determine, based on a correspondence between user label values and red envelope amounts, a plurality of initial red envelope amounts corresponding to each user label value of the user; and the determining unit 606 is further configured to determine a final red envelope amount of the user based on the plurality of initial red envelope amounts; and a sending unit 608, configured to issue a red envelope to the user based on the final red envelope amount that is determined by the determining unit 606.

The functions of the functional modules of the device in this implementation of the present specification can be implemented by the steps of the previous method implementations. Therefore, a specific working process of the device provided in this implementation of the present specification is omitted here.

The red envelope issuing device provided in this implementation of the present specification can issue red envelopes of different amounts to different users, thereby greatly improving the flexibility of issuing red envelopes.

The red envelope issuing device provided in this implementation of the present specification can be a module or unit of the network platform in FIG. 1.

Figure 7:
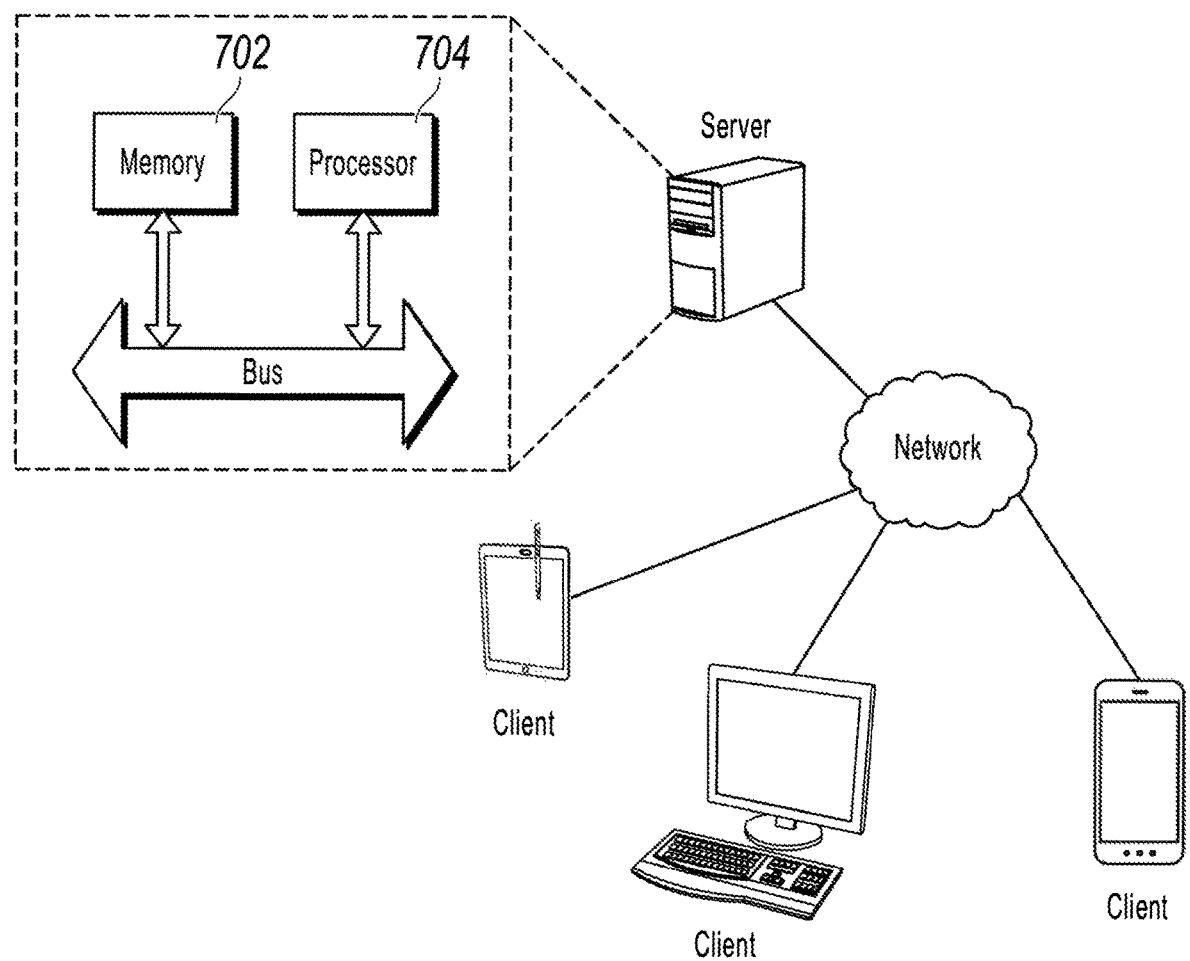
FIG. 7 is a schematic diagram illustrating a resource transfer device, according to an implementation of the present specification.

Corresponding to the previous resource transfer method, an implementation of the present specification further provides a resource transfer device. As shown in FIG. 7, the device can include a memory 702, at least one processor 704, and at least one program. The at least one program is stored in the memory 702 and is configured to be executed by the at least one processor 704 to implement the following steps: receiving a resource transfer request from a user, where the resource transfer request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and resource quotas, a plurality of initial resource quotas corresponding to each user label value of the user; determining a final resource quota of the user based on the plurality of initial resource quotas; and transferring resources to the user based on the final resource quota.

The resource transfer device provided in an implementation of the present specification can transfer resources to different users based on different quotas, thereby greatly improving the flexibility of resource transfer.

It is worthwhile to note that the resource transfer device shown in FIG. 7 is also applicable to the red envelope issuing device; that is, the red envelope issuing device can include a memory 702, at least one processor 704, and at least one program. The at least one program is stored in the memory 702 and is configured to be executed by the at least one processor 704. The difference is that the following steps are implemented when the program is executed by the at least processor 704: receiving a page access request from a user, where the page access request includes at least a user identifier of the user; obtaining profile data of a plurality of dimensions of the user based on the user identifier; determining a field value of a feature field corresponding to each dimension based on the profile data of each dimension; determining a plurality of user label values of the user based on the field value of the feature field corresponding to each dimension; determining, based on a correspondence between user label values and red envelope amounts, a plurality of initial red envelope amounts corresponding to each user label value of the user; determining a final red envelope amount of the user based on the plurality of initial red envelope amounts; and issuing a red envelope to the user based on the final red envelope amount.

The red envelope issuing device provided in this implementation of the present specification can issue red envelopes of different amounts to different users, thereby greatly improving the flexibility of issuing red envelopes.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The method or algorithm steps described in connection with the disclosure of the present specification may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium and write information into the storage medium. Of course, the storage medium may be a component of the processor. The processor and the storage medium may be located in the ASIC. In addition, the ASIC can be located in a server. Of course, the processor and the storage medium may exist in the server as discrete components.

A person skilled in the art should be aware that, in one or more of the previous examples, the functions described in the present invention can be implemented by using hardware, software, firmware, or any combination thereof. When these functions are implemented by software, they can be stored in a computer readable medium or transmitted as one or more instructions or code lines on the computer readable medium. Computer readable media include computer storage and communications media, where communication media include any medium that can be used to transfer computer programs from one place to another. The storage medium can be any medium available to a general-purpose or special-purpose computer.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The previous specific implementations further describe the object, technical solutions, and beneficial effects of the present specification in detail. It should be understood that the previous descriptions are merely specific implementations of the present specification and are not intended to limit the protection scope of the present specification. Any modification, equivalent replacement, and improvement made based on the technical solutions of the present specification shall fall within the protection scope of the present specification.

What is claimed is:

1. A computer-implemented method, comprising:
    receiving, by a computing device, a resource transfer request, wherein the resource transfer request comprises a user identifier of a user;
    obtaining, by the computing device, profile data for a plurality of dimensions of the user, based on the user identifier;
    determining, by the computing device, for each dimension of the plurality of dimensions, a field value of a feature field corresponding to the dimension, based on the profile data;
    generating, by the computing device, for each dimension of the plurality of dimensions, one or more user label values for the user, wherein generating one or more user label values for the user comprises (i) obtaining a plurality of value intervals for the feature field corresponding to the dimension, by dividing a value range of the field value of the feature field, and (ii) determining, from the plurality of value intervals for the feature field, a target value interval in which the field value of the feature field corresponding to the dimension falls;
    determining, by the computing device, for each of the user label values for the user and based on a correspondence between user label values and resource quotas, an initial resource quota corresponding to the user label value for the user;
    determining, by the computing device, a final resource quota for the user based on initial resource quotas; and
    transferring, by the computing device, resources to the user based on the final resource quota.

2. The computer-implemented method of claim 1, wherein determining the final resource quota for the user based on initial resource quotas comprises:
    performing a weighted summation of initial resource quotas for the user to obtain the final resource quota for the user.

3. The computer-implemented method of claim 1, further comprising:
    obtaining historical resource transfer records of the user based on the user identifier, wherein the historical resource transfer records comprise at least a quantity of historical requests and a quantity of historical transfers of resources; and
    wherein determining a final resource quota for the user based on initial resource quotas comprises:
    determining the final resource quota for the user based on the quantity of historical requests, the quantity of historical transfers, and the initial resource quotas.

4. The computer-implemented method of claim 1, further comprising:
    before transferring resources to the user based on the final resource quota, determining whether the final resource quota is within a predetermined range of values; and
    in response to the final resource quota being greater than an upper limit of the predetermined range of values, determining the upper limit as the final resource quota, or
    in response to the final resource quota being less than a lower limit of the predetermined range of values, determining the lower limit as the final resource quota.

5. The computer-implemented method of claim 1, wherein the profile data for the plurality of dimensions comprises one or more of historical access behavior data, transaction behavior data, user description data, and transaction data.

6. The computer-implemented method of claim 1, wherein the feature field corresponding to the dimension is determined based on a result of an AB test.

7. A non-transitory, computer-readable medium storing one or more instructions executable by a computer system to perform operations comprising:
    receiving, by a computing device, a resource transfer request, wherein the resource transfer request comprises a user identifier of a user;
    obtaining, by the computing device, profile data for a plurality of dimensions of the user, based on the user identifier;
    determining, by the computing device, for each dimension of the plurality of dimensions, a field value of a feature field corresponding to the dimension, based on the profile data;
    generating, by the computing device, for each dimension of the plurality of dimensions, one or more user label values for the user, wherein generating one or more user label values for the user comprises (i) obtaining a plurality of value intervals for the feature field corresponding to the dimension, by dividing a value range of the field value of the feature field, and (ii) determining, from the plurality of value intervals for the feature field, a target value interval in which the field value of the feature field corresponding to the dimension falls;
    determining, by the computing device, for each of the user label values for the user and based on a correspondence between user label values and resource quotas, an initial resource quota corresponding to the user label value for the user;

determining, by the computing device, a final resource quota for the user based on initial resource quotas; and transferring, by the computing device, resources to the user based on the final resource quota.

8. The computer-readable medium of claim 7, wherein determining the final resource quota for the user based on initial resource quotas comprises:

performing a weighted summation of initial resource quotas for the user to obtain the final resource quota for the user.

9. The computer-readable medium of claim 7, the operations further comprising:

obtaining historical resource transfer records of the user based on the user identifier, wherein the historical resource transfer records comprise at least a quantity of historical requests and a quantity of historical transfers of resources; and wherein determining a final resource quota for the user based on initial resource quotas comprises:

determining the final resource quota for the user based on the quantity of historical requests, the quantity of historical transfers, and the initial resource quotas.

10. The computer-readable medium of claim 7, the operations further comprising:

before transferring resources to the user based on the final resource quota, determining whether the final resource quota is within a predetermined range of values; and in response to the final resource quota being greater than an upper limit of the predetermined range of values, determining the upper limit as the final resource quota, or in response to the final resource quota being less than a lower limit of the predetermined range of values, determining the lower limit as the final resource quota.

11. The computer-readable medium of claim 7, wherein the profile data for the plurality of dimensions comprises one or more of historical access behavior data, transaction behavior data, user description data, and transaction data.

12. The computer-readable medium of claim 7, wherein the feature field corresponding to the dimension is determined based on a result of an AB test.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a computing device, a resource transfer request, wherein the resource transfer request comprises a user identifier of a user;

obtaining, by the computing device, profile data for a plurality of dimensions of the user, based on the user identifier;

determining, by the computing device, for each dimension of the plurality of dimensions, a field value of a feature field corresponding to the dimension, based on the profile data;

generating, by the computing device, for each dimension of the plurality of dimensions, one or more user label values for the user, wherein generating one or more user label values for the user comprises (i) obtaining a plurality of value intervals for the feature field corresponding to the dimension, by dividing a value range of the field value of the feature field, and (ii) determining, from the plurality of value intervals for the feature field, a target value interval in which the field value of the feature field corresponding to the dimension falls;

determining, by the computing device, for each of the user label values for the user and based on a correspondence between user label values and resource quotas, an initial resource quota corresponding to the user label value for the user;

determining, by the computing device, a final resource quota for the user based on initial resource quotas; and transferring, by the computing device, resources to the user based on the final resource quota.

14. The computer-implemented system of claim 13, wherein determining the final resource quota for the user based on initial resource quotas comprises:

performing a weighted summation of initial resource quotas for the user to obtain the final resource quota for the user.

15. The computer-implemented system of claim 13, the operations further comprising:

obtaining historical resource transfer records of the user based on the user identifier, wherein the historical resource transfer records comprise at least a quantity of historical requests and a quantity of historical transfers of resources; and wherein determining a final resource quota for the user based on initial resource quotas comprises:

determining the final resource quota for the user based on the quantity of historical requests, the quantity of historical transfers, and the initial resource quotas.

16. The computer-implemented system of claim 13, the operations further comprising:

before transferring resources to the user based on the final resource quota, determining whether the final resource quota is within a predetermined range of values; and in response to the final resource quota being greater than an upper limit of the predetermined range of values, determining the upper limit as the final resource quota, or in response to the final resource quota being less than a lower limit of the predetermined range of values, determining the lower limit as the final resource quota.

17. The computer-implemented system of claim 13, wherein the profile data for the plurality of dimensions comprises one or more of historical access behavior data, transaction behavior data, user description data, and transaction data.

18. The computer-implemented system of claim 13, wherein the feature field corresponding to the dimension is determined based on a result of an AB test.

* * * * *